Oct. 10, 1950 A. P. SAUER 2,525,728
ROAD SIGNAL DEVICE
Filed July 24, 1947 3 Sheets-Sheet 1
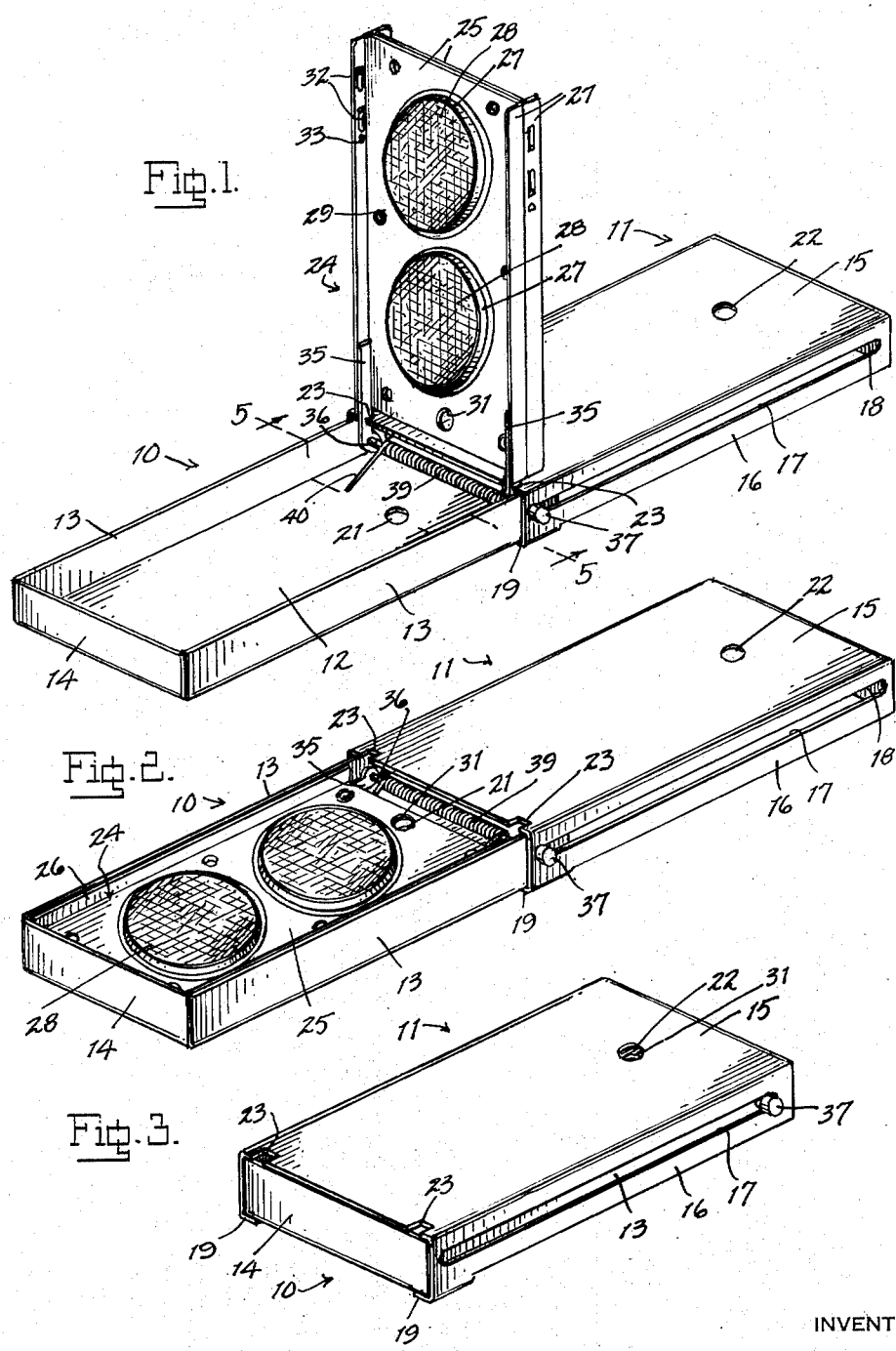
INVENTOR.
ARTHUR P. SAUER
BY
ATTORNEY.

Oct. 10, 1950 A. P. SAUER 2,525,728
ROAD SIGNAL DEVICE
Filed July 24, 1947 3 Sheets-Sheet 2
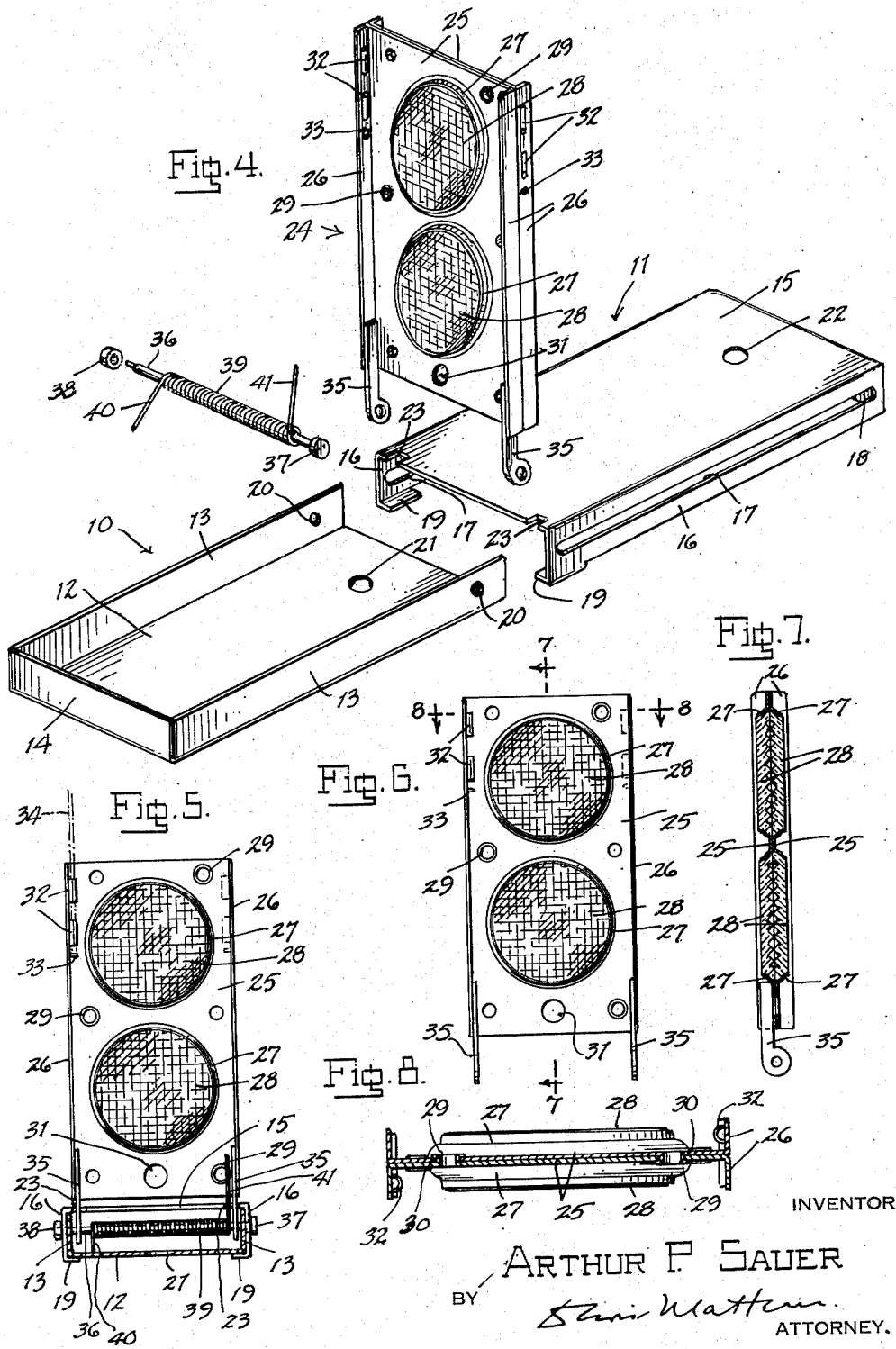
INVENTOR.
ARTHUR P. SAUER
BY
ATTORNEY.

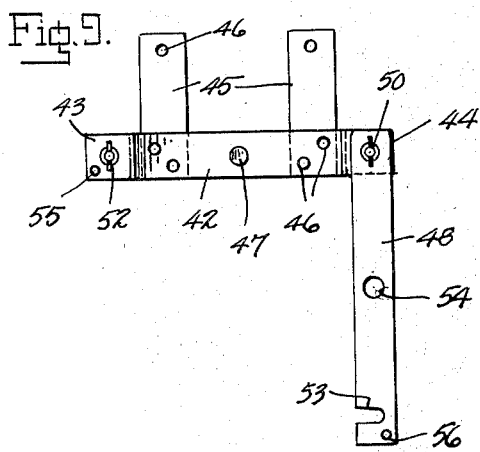
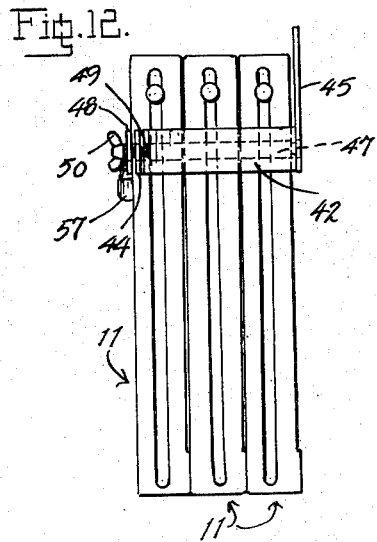
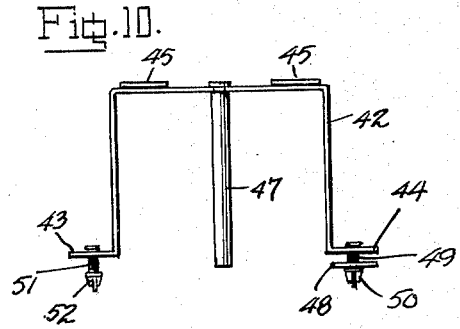
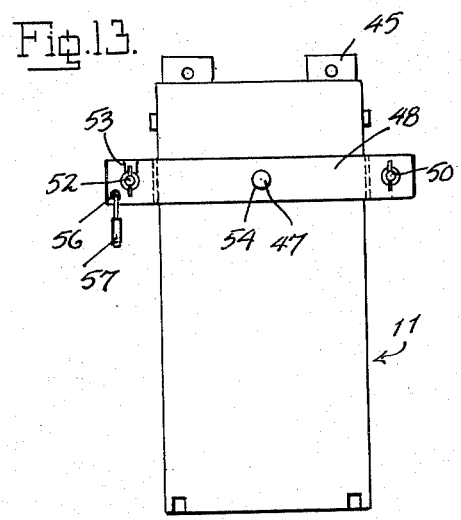
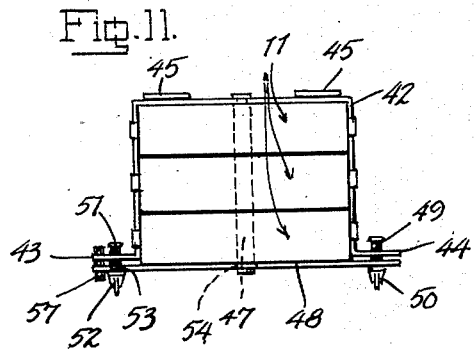
INVENTOR.
ARTHUR P. SAUER

Patented Oct. 10, 1950

2,525,728

UNITED STATES PATENT OFFICE 2,525,728

ROAD SIGNAL DEVICE

Arthur P. Sauer, Fairfield, Conn., assignor to The Kilborn-Sauer Company, Fairfield, Conn., a corporation of Connecticut Application July 24, 1947, Serial No. 763,293

2 Claims. (Cl. 248—33)

1

The present invention relates to a road signal device, particularly of the type adapted for use as an emergency signal for trucks and other vehicles. The invention is especially directed to that type of road signal device employing a reflecting element of the auto-collimating lens type which is illuminated by the head light rays of oncoming vehicles.

An object of the invention is to provide a signal device of simple and sturdy construction, and which may be easily operated into its erected signaling position simply by opening movement of a telescoping container constituting the base of the signaling device, and without the necessity for operating locking levers, interlocking parts or the like, such as have been employed on signal devices heretofore in use.

A further object is to provide a spring actuated signaling element, the spring being arranged to automatically move the signaling element into its erected position and to effectually retain it in such position, such spring having the further function of maintaining the parts while in their inoperative closed position against relative movement and rattling.

Another object is to provide a supporting bracket for cooperation with a plurality of the signaling devices, so as to support them in firmly retained non-rattling relation within the truck or other vehicle, when the signaling devices are not in use.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a perspective view showing the signal device of the invention in its erected operative position.

Fig. 2 is a perspective view showing the hinged signal member folded into the container portion of the telescopic base, preparatory to closing the latter.

Fig. 3 is a perspective view showing the signal device in its closed position.

Fig. 4 is a perspective view showing the several parts of the signal device in operated relation.

Fig. 5 is a vertical sectional view, taken along the line 5—5 of Fig. 1, the dot-and-dash lines indicating the position of the shaft of a signal flag adapted to be inserted in the device.

Fig. 6 is a front elevation of the signal member of the device.

2

Fig. 7 is a vertical sectional view, taken along the lines 7—7 of Fig. 6.

Fig. 8 is a horizontal sectional view, on an enlarged scale, taken along the lines 8—8 of Fig. 6.

Fig. 9 is a front elevation of the supporting rack for the signaling device, the same being shown in open position.

Fig. 10 is a top plan view of the rack in open position.

Fig. 11 is a top plan view of the rack, showing three of the signal devices supported therein.

Fig. 12 is a side elevation showing the rack and the signal devices supported therein.

Fig. 13 is a front elevation thereof.

Similar reference characters indicate corresponding parts throughout the several figures of the drawings.

Referring to the drawings, the road signal device, according to the illustrated exemplary embodiment of the invention, comprises a telescopic base consisting of a container part, indicated generally as 10, and a cover part, indicated generally as 11, the container part comprising a rectangular bottom wall 12, longitudinal side walls 13—13, and a front wall 14. The cover part 12 consists of a rectangular top wall 15, horizontal side walls 16—16, each having a longitudinal slot 17 therein, and a rear wall 18. At the forward ends of the lower edges of the side walls 16, there are provided inwardly extending retaining flanges 19—19, for retaining the container part 10 in telescopic relation with the cover part 11. Near the rearward ends of the side walls 13—13 of the container part there are provided laterally aligned shaft receiving holes 20—20 which register with the slots 17 in the telescopically engaged relation of the container part with the cover part. The bottom wall 12 of the container part is provided centrally near its rearward edge with a circular hole 21 which, in the closed relation of the container part as seen in Fig. 3, registers with a correspondingly shaped hole 22 in the top wall 15 of the cover part, for the purpose of receiving a supporting rod of the supporting rack, as will hereinafter more fully appear. At the forward edge of the top wall 15 of the cover part, near its longitudinal edges, there are provided notches 23—23 for cooperation with the hinged signal member, as will presently more fully appear.

The hinged signal member, indicated generally as 24, comprises a pair of identical rectangular plates 25—25 provided at each of their vertical edges with flanges 26—26. The plates 25 are each provided with a pair of circular flanged openings 27—27 in which are engaged the auto-collimating reflecting lens elements 28—28, the pair of plate members together with their inserted lenses being secured together in back-to-back relation, as shown in Figs. 7 and 8. The securing means for the plates may consist of rivets, welding, or the like. Preferably, the two plates are secured by a plurality of tubular flanged rivets 29, integrally formed upon each plate, and engaged in a plurality of circular holes 30, formed in registering relation in the other plate, as clearly shown in Fig. 6, each plate being provided with three flanged rivets 29 and three holes 30 identically placed upon each plate, so that when they are placed in back-to-back relation the rivets of one plate engage the holes of the other.

The plates are provided near their lower edges with registering holes 31, corresponding to the holes 21 and 22 of the base, and which in the closed position of the signal device, as seen in Fig. 3, register with these holes 21 and 22 to receive the supporting rod of the supporting rack, as will hereinafter more fully appear.

One of the flanges 26 of each of the plates is provided near its upper end with inwardly pressed vertically aligned tubular portions 32—32 and a stop lug 33 below them, these being for the purpose of receiving the shaft of a signal flag when the signal device is being used in the daytime. This shaft is shown by the dot-and-dash lines 34 in Fig. 5, the lower end of the shaft being supported upon the stop lug 33.

The side flanges 26 of the forwardly disposed plate 25 of the signal member have secured inwardly of their lower end portions a pair of downwardly projecting apertured hinge members 35—35. A transverse hinge shaft 36, provided at one end with a head 37, is engaged through the slots 17 of the cover part 11, the holes 20 of the container part 10, and the holes of the hinge members 35, to thus retain the container and cover parts in their engaged telescopic relation and to provide a hinged support for the signal member 24. The shaft 36 is secured by a collar 38 engaged upon its end and riveted or otherwise suitably fixed in place.

The rectangular dimensions of the signal member 24 are such that it may be folded downwardly into fitting relation within the container part 10, as seen in Fig. 2, whereupon the container part may be telescopically moved to its closed position, as seen in Fig. 3. In the fully opened position, as seen in Fig. 2, the signal member is free to swing upwardly to its erected signaling position, as seen in Fig. 1, and in which position the hinge members 35 engage within the notches 23, abutting the ends of the notches to position the signal member in vertical relation to the extended horizontal supporting base.

Upon the shaft 36 there is engaged a helical coil spring 39 having one end 40 extended forwardly and downwardly into engagement with the bottom wall 12 of the container part 10 and its other end 41 extended upwardly into engagement with the forward side of the hinged signal member 24, being disposed adjacent the inner side of one of the hinge members 35, so that in the erected position shown in Fig. 1 this end of the spring engages within one of the notches 23. In the fully open position of the base, as seen in Fig. 2, wherein the hinged signal member is free to swing upwardly, the spring will automatically swing it to its erected position, as seen in Fig. 1. Thus the signal member is automatically erected upon opening the base to its fully extended position. The strength of the spring is sufficient to maintain the signal member erected against the force of any usual gust of wind. In order to close the signal device it is only necessary to press the hinged signal member downwardly into the container part of the base, and slide the container part into the cover part, the signal member being retained against upward swinging movement as soon as the flanges 26 enter beneath the top wall of the cover part. In such closed position the spring exerts sufficient pressure upon the hinged signal member to press it firmly against the cover part to prevent rattling movement by the parts of the device. The depth of the flanges 26 is slightly greater than the projection of the lenses, so that in the closed position the surfaces of the lenses are effectually protected from contact with the bottom and top walls 12 and 15. Also in the closed position the signal member is completely sealed against the entrance of dirt and dust.

A set of signaling devices for a vehicle usually consists of three, for placing at the forward and rearward ends of the vehicle and at the side, and when not in use it is desirable that they be stored in such manner that they are readily accessible for use. In Figs. 9 to 13 there is illustrated a rack for cooperation with the signal device of the invention. This rack consists of a U-shape strap member 42 having outwardly bent ears 43 and 44 at its forward ends, the rack adapted to be supported by suitable vertically disposed straps 45—45, welded or otherwise secured to its rearward side and provided at suitable points with bolt receiving holes 46. A rod 47 is secured centrally of the rearward side of the strap 42, and projects forwardly to a point beyond the forward faces of the ears 43 and 44, and is adapted to be engaged through the registering holes 21, 31 and 22 of each of the three signal devices of the set.

A retaining bar 48 is pivotally connected to the ear 44 by a bolt 49 screwed into the ear and loosely engaged in the bar and provided with a winged head 50 for convenient turning. The ear 43 is provided with a similar bolt 51 screwed therein and having a wing head 52, and which engages a slot 53 in the bar 48 when the latter is swung to its closed position. A hole 54 is provided centrally of the bar 48 for engagement by the end of the rod 47. In operation, the bolts 49 and 51 are screwed outwardly, prior to closing the bar, so that the hole 54 may be engaged with the end of the rod 47, and the bar thereupon moved inwardly by tightening the bolts into a clamping relation with the signaling devices. The ear 43 and the bar 48 are provided with registering holes 55 and 56 for receiving a padlock 57 or the like, to prevent the unauthorized removal of the signal devices from the rack.

I have illustrated and described a preferred and satisfactory embodiment of the invention, but it will be understood that changes may be made therein, within the spirit and scope thereof, as defined in the appended claims.

What is claimed is:

1. In a road signal device, a housing base consisting of a container part and a cover part telescopically engaged for opening extension movement in a horizontal direction, each of said parts having longitudinal side walls, an outer end wall, and an open inner end, there being longitudinal slots in the side walls of one of said parts, a transverse shaft carried between the side walls of the other of said parts and engaged in said slots to limit said opening extension movement, and a signal member hingedly mounted at its lower end on said shaft and adapted to have swinging movement between a horizontal position in said container part and a vertical signaling position.

2. In a road signal device, a housing base consisting of a container part and a cover part telescopically engaged for opening extension movement in a horizontal direction, each of said parts having longitudinal side walls, an outer end wall, and an open inner end, there being longitudinal slots in the side walls of said cover part, a transverse shaft carried between the side walls of said container part and engaged in said slots to limit said opening extension movement, and a signal member hingedly mounted at its lower end on said shaft and adapted to have swinging movement between a horizontal position in said container part and a vertical signaling position, and a spring on said shaft exerting pressure on said signal member to swing it to vertical signaling position.

ARTHUR P. SAUER.

REFERENCES CITED

The following references are of record in the file of this patent:

UNITED STATES PATENTS

| Number | Name | Date |
| --- | --- | --- |
| 1,875,541 | Zell | Sept. 6, 1932 |
| 1,895,061 | Worssam | Jan. 24, 1933 |
| 2,220,953 | Carver | Nov. 12, 1940 |
| 2,235,282 | Carver | Mar. 18, 1941 |
| 2,235,283 | Carver | Mar. 18, 1941 |
| 2,256,014 | Carver | Sept. 16, 1941 |